(12) United States Patent
Tamai

(10) Patent No.: US 7,247,124 B2
(45) Date of Patent: Jul. 24, 2007

(54) TRANSMISSION CONTROL BASED ON KNOCK LEVEL

(75) Inventor: Goro Tamai, West Bloomfield, MI (US)

(73) Assignee: General Motors Corporation, Detroit, MI (US)

(*) Notice: Subject to any disclaimer, the term of this patent is extended or adjusted under 35 U.S.C. 154(b) by 269 days.

(21) Appl. No.: 10/973,689

(22) Filed: Oct. 26, 2004

(65) Prior Publication Data

US 2006/0089236 A1    Apr. 27, 2006

(51) Int. Cl.
*B60K 10/10* (2006.01)
(52) U.S. Cl. ................... 477/115; 123/435; 701/51; 701/111
(58) Field of Classification Search .............. 477/97, 477/115; 123/435; 701/51, 111
See application file for complete search history.

(56) References Cited

U.S. PATENT DOCUMENTS

| | | | | |
|---|---|---|---|---|
| 4,572,031 A | * | 2/1986 | Yokooku et al. | 477/43 |
| 4,677,878 A | * | 7/1987 | Yamamori et al. | 477/48 |
| 4,913,005 A | * | 4/1990 | Ishikawa et al. | 60/448 |
| 5,477,452 A | * | 12/1995 | Milunas et al. | 701/1 |
| 5,655,992 A | * | 8/1997 | Hattori | 477/107 |

* cited by examiner

*Primary Examiner*—David D. Le
(74) *Attorney, Agent, or Firm*—Christopher DeVries

(57) ABSTRACT

An automated method for controlling a vehicle having an engine and a transmission includes sensing knock activity in the engine. A transmission ratio applicable to the transmission is selected based on the sensed knock activity. This method allows a vehicle to be operated in a fuel-efficient manner while knock-sensitive operating conditions are avoided.

15 Claims, 5 Drawing Sheets

TRANSMISSION CONTROL BASED ON KNOCK LEVEL

FIELD OF THE INVENTION

The present invention relates generally to powertrain control systems, and more particularly to powertrain control systems for step-gear and/or continuously variable transmissions that are based on knock level.

BACKGROUND OF THE INVENTION

A vehicle powertrain typically includes an automatic transmission which may be, for example, a step-gear transmission or a continuously variable transmission (CVT). It may be desirable to promote fuel economy in a vehicle by controlling the transmission of the vehicle accordingly. For example, a CVT can be used to reduce engine speed (engine RPM, or ERPM) for a given axle power. In other words, the engine speed can be optimized for economy and the CVT varies the speed of the vehicle. In a vehicle in which a CVT is utilized, brake-specific fuel consumption (BSFC) can be reduced due to lower pumping losses and lower rubbing friction.

There are limitations, however, to the extent of ERPM reduction that can be implemented during driving. For example, excessive ERPM reduction could increase noise and vibration of the driveline and/or vehicle body and could degrade the driving experience. Combustion detonation, or "knock", might also occur. Knock can occur for a given ERPM or load due to high ambient air or engine temperatures. Poor fuel quality and low fuel octane also can cause knock. As ERPM is reduced during vehicle operation, knock can arise even before the ERPM is reduced to levels where noise or vibration might occur. Vehicles having step-gear transmissions also may be subject to knock.

CVTs are usually calibrated conservatively, i.e., to avoid knock-sensitive operating conditions. If a CVT is calibrated aggressively, for example, to promote fuel economy and knock is detected, an engine control module would typically retard spark in response. Although knock would be reduced by this response, it is likely that fuel efficiency and driver satisfaction also would be reduced.

SUMMARY OF THE INVENTION

The present invention, in one embodiment, is directed to an automated method for controlling a vehicle having an engine and a transmission. The method includes sensing knock activity in the engine. A transmission ratio map (CVT), ratio shift pattern (step transmission), or Torque-Converter Clutch slip schedule, applicable to the transmission is selected based on the sensed knock activity.

In another embodiment, a method of calibrating a transmission of a vehicle including one or more modules that can detect knock includes determining a plurality of levels of knock detectable in the vehicle. A plurality of transmission ratios applicable in the transmission are determined. The determined transmission ratios are associated with the determined knock levels such that, when one of the knock levels is detected during operation of the vehicle, a transmission ratio map (CVT), ratio shift pattern (step transmission), or Torque-Converter Clutch slip schedule, associated with the detected knock level may be applied in the transmission.

In yet another embodiment, a system for controlling a vehicle having an engine and a transmission includes one or more modules that detect knock activity in the engine. A control module selects a transmission ratio map (CVT) ratio shift pattern (step transmission), or Torque-Converter-Clutch slip schedule, applicable in the transmission based on the detected knock activity. In all the embodiments, calibrate offsets to the existing calibrations can be used as well.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

The following description of various embodiments of the present invention is merely exemplary in nature and is in no way intended to limit the invention, its application, or uses. Although embodiments of the present invention are described with reference to an engine control module, it should be understood that the invention is not so limited. Additionally or alternatively, another control module, including but not limited to a transmission controller, could also be used in other embodiments.

Figure 1:
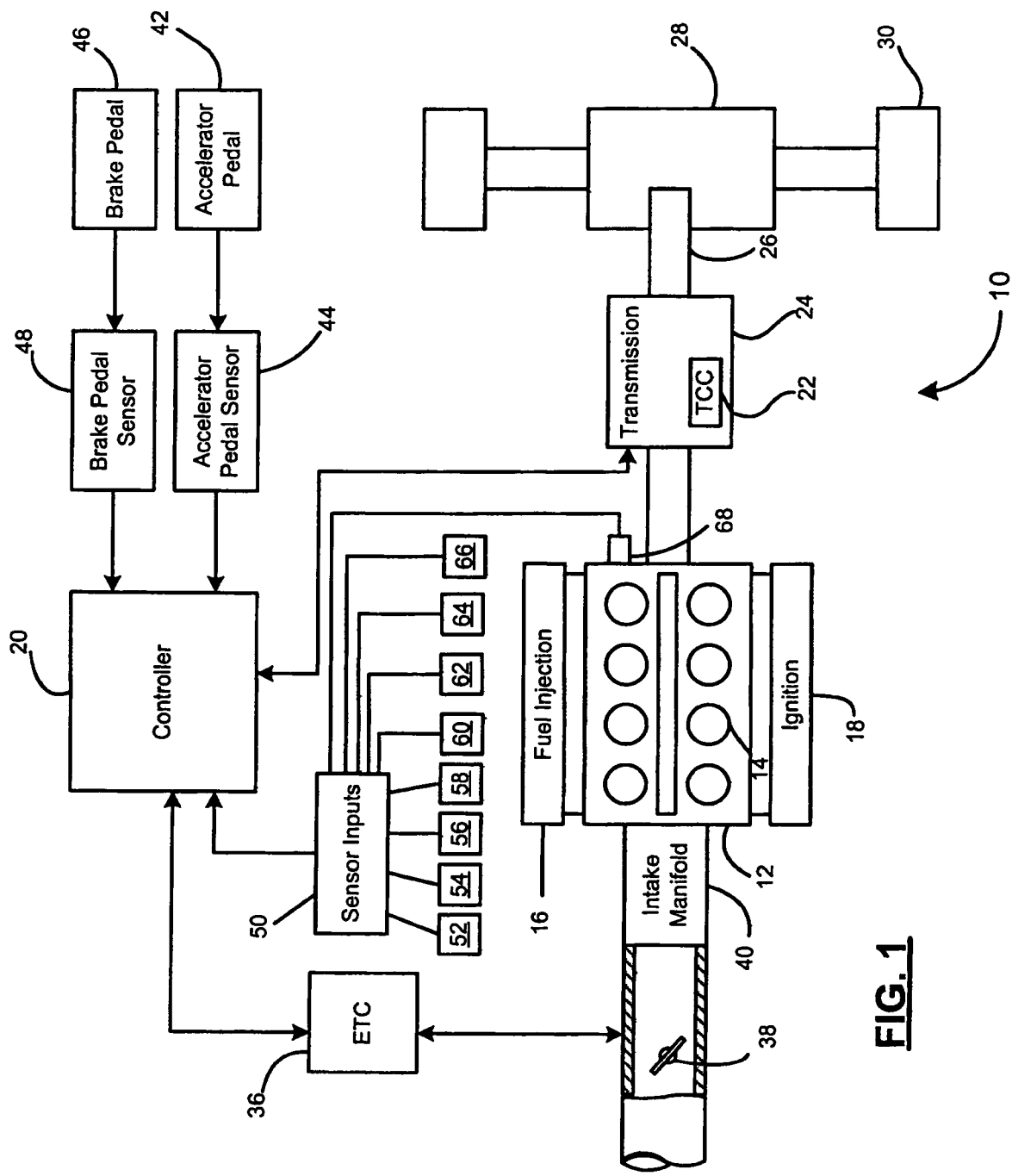
FIG. 1 is a functional block diagram of a vehicle control system according to one embodiment of the present invention.

A vehicle having a control system in accordance with one embodiment is referred to generally in FIG. 1 by reference number 10. The vehicle 10 includes an engine 12 having a plurality of cylinders 14, each with one or more intake valves and/or exhaust valves (not shown). The engine 12 is configured with a fuel injection system 16 and an ignition system 18. An output of the engine 12 is coupled by a torque converter 22, a transmission 24, a driveshaft 26 and a differential 28 to driven front wheels 30. The transmission 24, which may be, for example, a continuously variable transmission (CVT) or a step-gear automatic transmission, is controlled by an engine control module 20. It should be understood that another control module, for example, a transmission controller, could be used alone or in combination with the control module 20 in other embodiments to control the transmission 24.

An electronic throttle controller (ETC) 36, or a cable-driven throttle, adjusts a throttle plate 38 that is located adjacent to an inlet of an intake manifold 40 based upon a position of an accelerator pedal 42 and a throttle control algorithm that is executed by the control module 20. The throttle 38 adjusts output torque that drives the wheels 30. An accelerator pedal sensor 44 generates a pedal position signal that is output to the control module 20 based on a position of the accelerator pedal 42. A position of a brake pedal 46 is sensed by a brake pedal sensor or switch 48, which generates a brake pedal position signal that is output to the control module 20. Other sensor inputs collectively indicated by reference number 50 and used by the control module 20 include a signal 52 indicating engine speed, a vehicle speed signal 54, an intake manifold pressure signal 56 and a throttle position signal 58. A trans throttle signal 60, indicates throttle pressure in the transmission 24. Signals 62 and 64 indicate transmission input and output pulley speeds. A signal 66 indicates manifold air temperature.

A knock sensor 68, e.g., an accelerometer, mounted on the engine 12 can sense combustion detonation (also known as knock) in one or more cylinders 14 and provides a signal to the control module 20 indicating the extent of any sensed knocking. Knock detection in the vehicle 10 could be performed, however, using means and/or methods other than by using the knock sensor 68. For example, parameters sensed using other components of the vehicle 10 could be used to indirectly determine whether knock is present.

Figure 2:
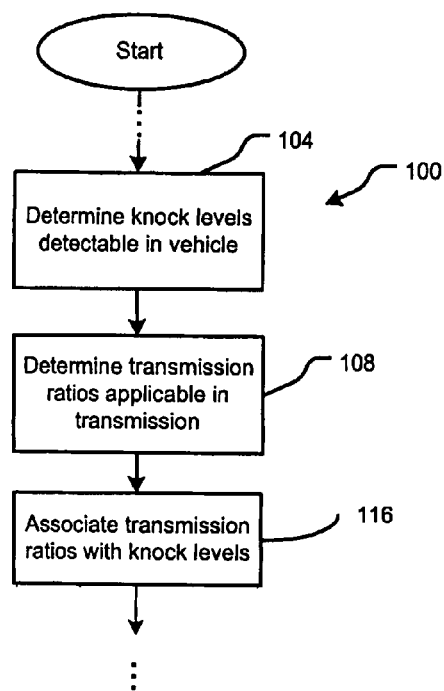
FIG. 2 is a flow diagram of a method of calibrating a continuously variable transmission (CVT) according to one embodiment.

A method of calibrating the transmission 24 is indicated generally by reference number 100 in FIG. 2. At step 104, a plurality of levels of knock detectable in the vehicle 10 are determined. More specifically, knock detectable, for example, by the knock sensor 68 is quantified as a plurality of knock levels. The control module 20 may be configured to rank knock activity in intensity, for example, as low, medium and high levels. It is easily seen that more than or fewer than three levels and/or ranges of knock activity could be implemented.

At step 108, a plurality of transmission ratios applicable in the transmission 24 are determined. Where the transmission 24 is a step-gear transmission, for example, transmission ratios are determined in accordance with various step-gear levels of the transmission. Where the transmission 24 is a CVT, transmission ratios may be determined in accordance with substantially continuous curves as known in the art. At step 116, the knock levels determined as previously described are associated with the determined transmission ratios, such that, when one of the knock levels is detected during operation of the vehicle, a transmission ratio associated with the detected knock level may be applied in the transmission 24. The method 100 can be implemented relative to step-gear transmissions and/or CVTs, as further described below, to reduce knock activity and promote fuel economy in the vehicle 10.

Thus, for example, where the transmission 24 is a CVT, transmission ratios may be included in a ratio map associated with a particular knock level. Where, for example, the transmission 24 is a step-gear transmission, transmission ratios correspond to various step-gear levels of the transmission 24. As further described below, a particular step-gear transmission ratio may be applied over a longer engine speed range in response to one knock level than in response to another knock level detected in the vehicle.

Figure 3:
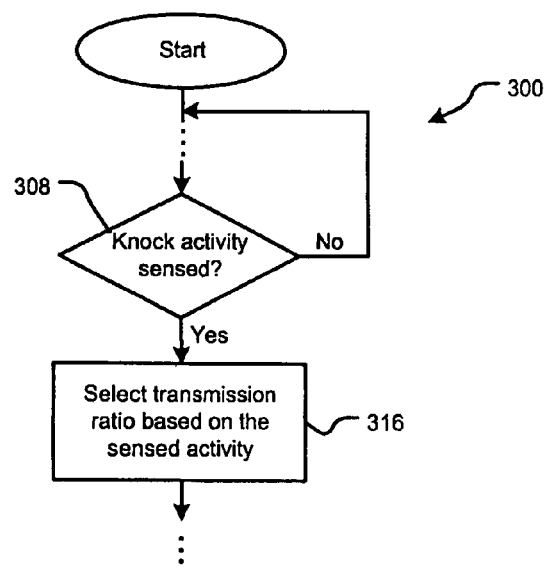
FIG. 3 is a flow diagram of a method for controlling a vehicle according to one embodiment.

In operation, the vehicle 10 can be controlled using an implementation of a method indicated generally by reference number 300 in FIG. 3. At step 308, the knock sensor 68 (and/or other knock-detecting means) senses knock activity in the engine 12. At step 316, the control module 20 selects a transmission ratio applicable to the transmission 24 based on the sensed knock activity. Specifically, the control module 20 determines a knock level based on the sensed knock activity, and a transmission ratio associated with the determined knock level is applied in the transmission 24. Where the transmission 24 is a CVT, the control module 20 may select a transmission ratio map based on the determined knock level. Where the transmission 24 is a step-gear transmission, the control module 20 may accelerate or delay shifting from one gear level to another based on the determined knock level.

Figure 4:
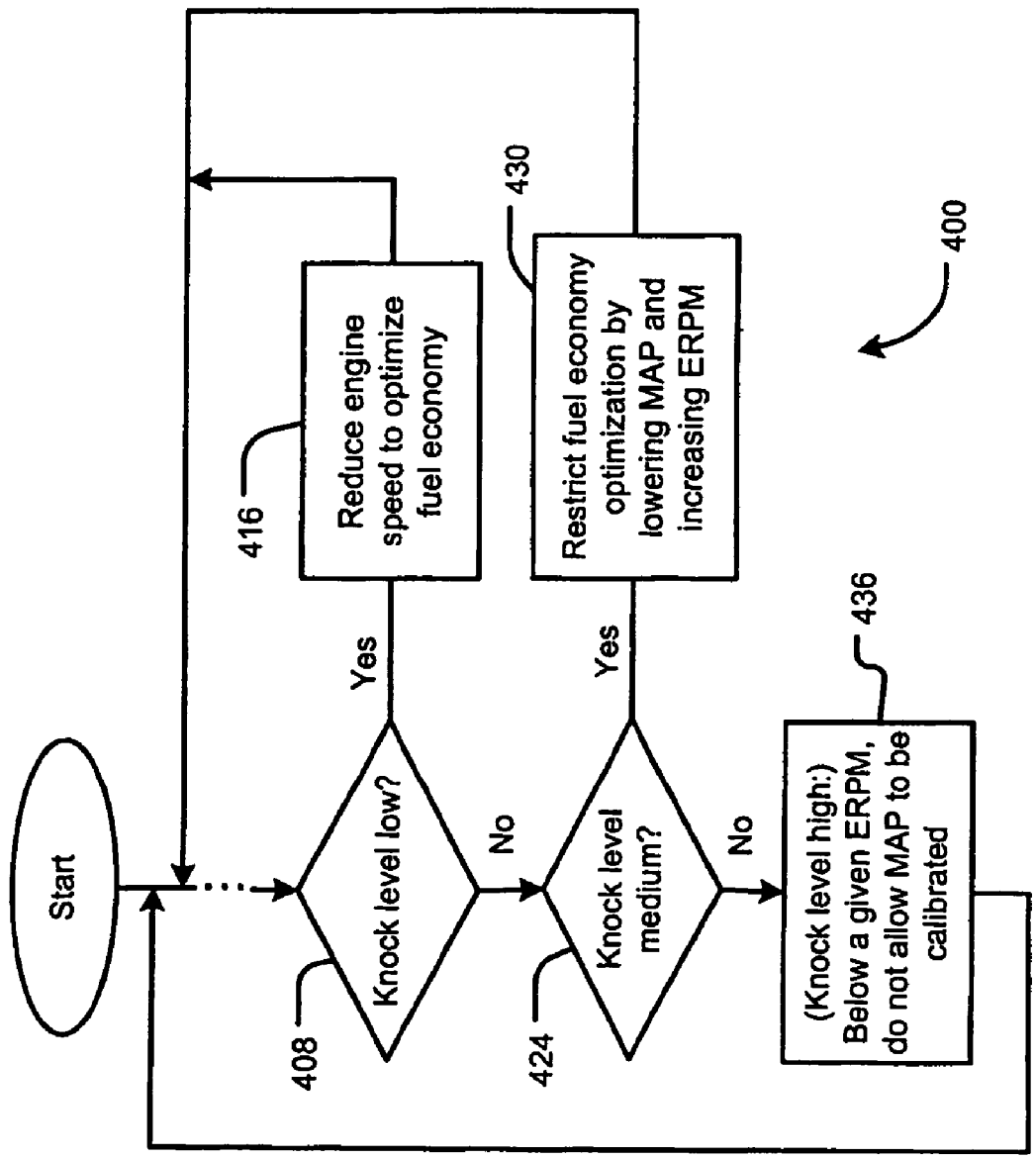
FIG. 4 is a flow diagram of a method for controlling a vehicle according to one embodiment.

Another exemplary method of controlling the vehicle 10 is indicated generally in FIG. 4 by reference number 400. If at step 408 it is determined that knock is at a low level, then at step 416 a transmission ratio is applied in the transmission 24 to optimize fuel economy, for example, by reducing engine speed while avoiding noise and vibration to maintain applicable drivability qualities during vehicle operation. If at step 424 it is determined that knock is at a medium level, then at step 430 a transmission ratio is applied in the transmission 24 to restrict fuel economy optimization, for example, such that manifold air pressure (MAP) is reduced and engine speed (ERPM) is increased. If at step 424 it is determined that knock is not at a medium level, i.e., is at a high level, then at step 436 a transmission ratio is applied in the transmission 24, for example, to ensure that below a given ERPM, manifold air pressure above some value is not allowed to be calibrated.

Figure 5:
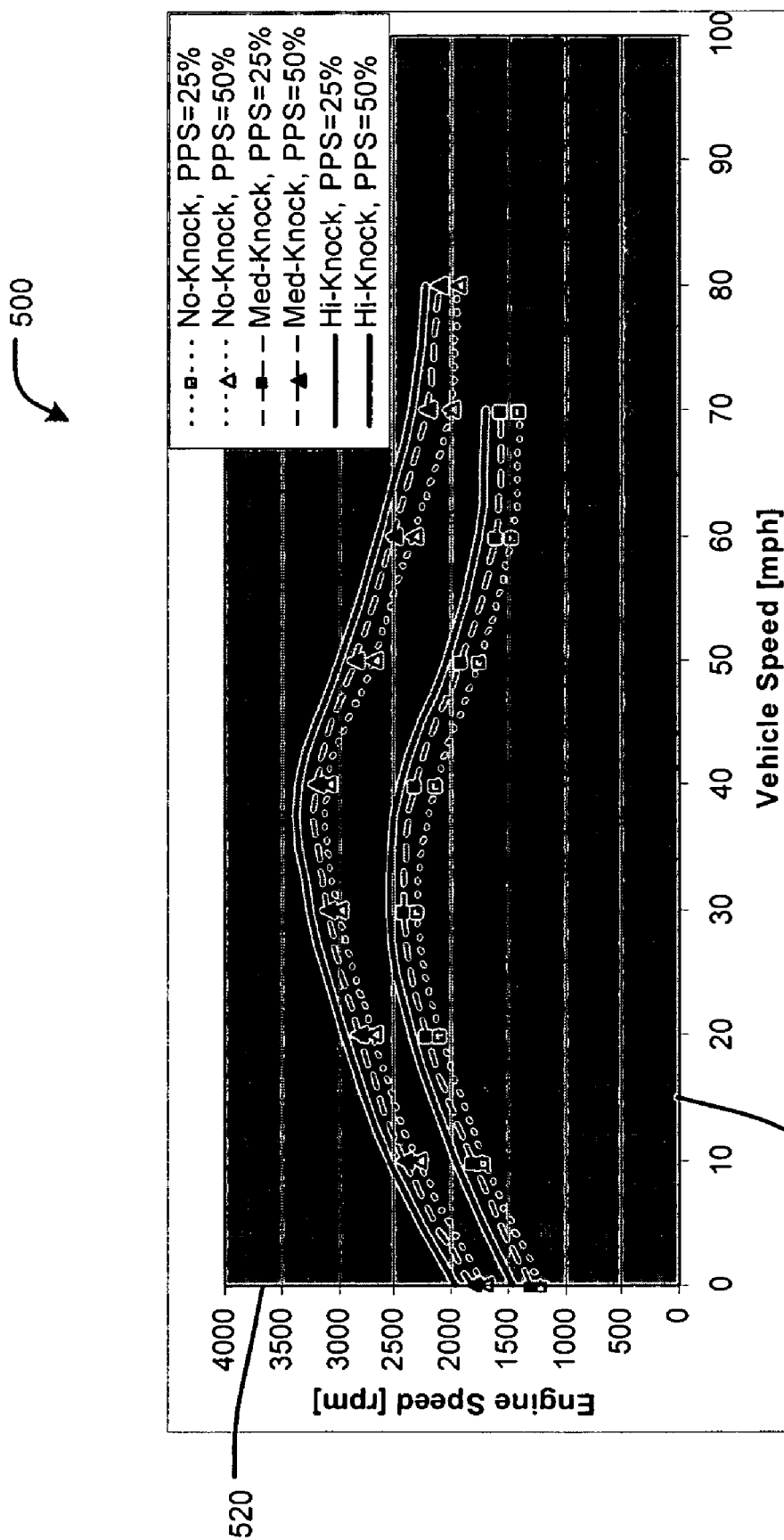
FIG. 5 is a graph illustrating results of continuously variable transmission ratio mapping as a function of knock activity according to one embodiment.

A graph that illustrates results of CVT ratio mapping as a function of engine knock activity according to one embodiment is indicated generally in FIG. 5 by reference number 500. Engine speed 520 is shown over a plurality of vehicle speeds 528, for two levels (25 and 50 percent) of an accelerator pedal sensor (APS) and for three knock levels (high, medium and none). As knock level increases, transmission ratios for a CVT are decreased, which for a given power output, decreases engine load (a major contributor to knock) and increases engine speed 520. When knock is at low levels, engine speed 520 is lowered to increase engine efficiency.

Figure 6:
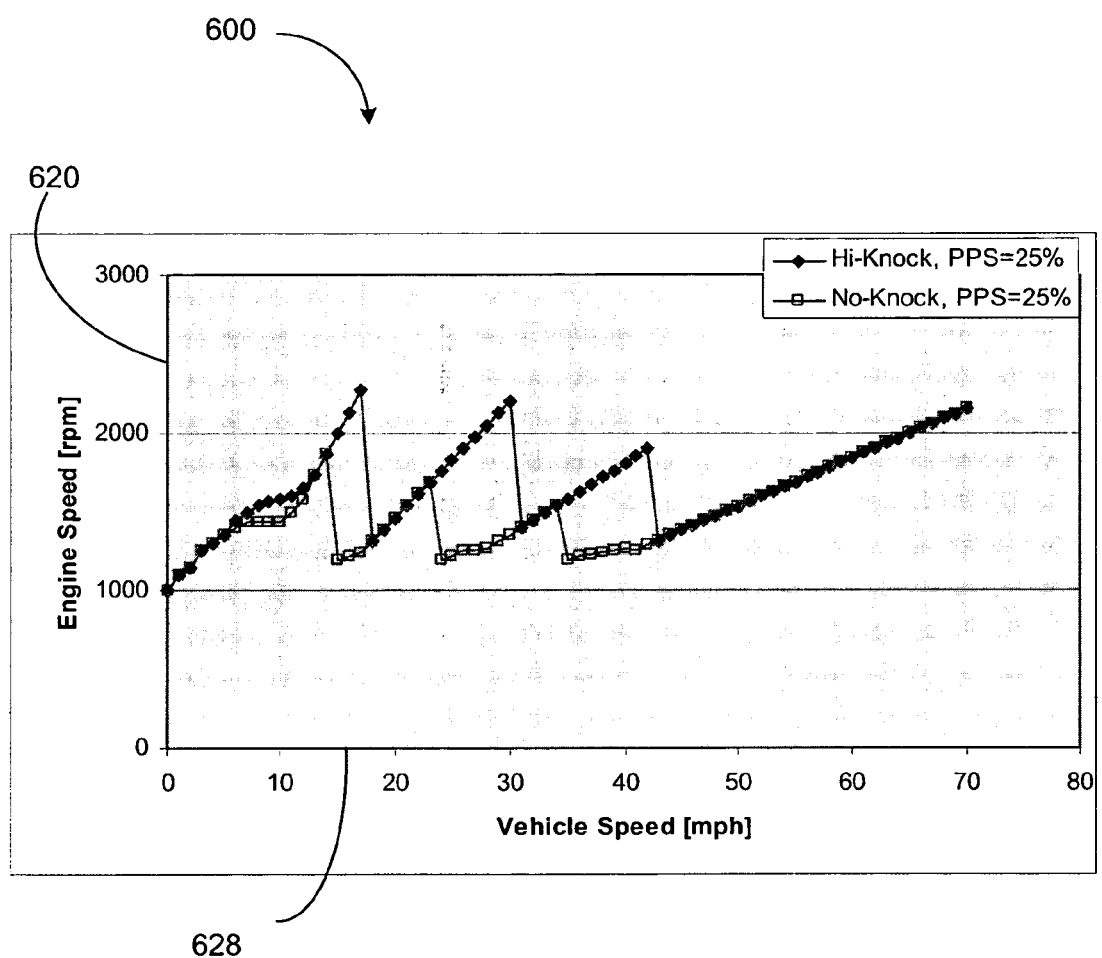
FIG. 6 is a graph illustrating results of selecting transmission ratios in a step-gear transmission as a function of knock activity according to one embodiment.

A graph that illustrates results of selecting transmission ratios for a step-gear transmission as a function of engine knock activity according to one implementation is indicated generally in FIG. 6 by reference number 600. Engine speed 620 is shown over a plurality of vehicle speeds 628, for two levels (25 and 50 percent) of the accelerator pedal sensor (APS) and for two knock levels (high and no knock). For no or low-knock conditions, a transmission may be upshifted aggressively (that is, relatively early) to optimize fuel economy. For higher knock levels, upshifts may be delayed to reduce engine load and thus decrease propensity for knock.

During vehicle operation, a transmission ratio and/or ratio map may be changed based on knock level. Engine load may be controlled in one configuration, for example, by a combination of transmission ratio, electronic throttle control, cam timing (e.g. cam phaser positioning), and spark timing. Embodiments of the foregoing system and methods allow a vehicle to be operated in a fuel-efficient manner while knock-sensitive operating conditions are avoided. Thus fuel economy can be maximized while driver satisfaction is maintained.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. An automated method for controlling a vehicle having an engine and a transmission, said method comprising:
   sensing knock activity in the engine;
   based on an intensity of the knock activity, selecting a knock level from a plurality of predetermined knock levels; and
   selecting a transmission ratio applicable to the transmission based on the knock level.

2. The method of claim 1 wherein the step of selecting a transmission ratio comprises:
   selecting a transmission ratio map that optimizes fuel economy when the sensed knock activity is at a low level; and
   selecting a transmission ratio map that restricts fuel economy optimization when the sensed knock activity exceeds the low level.

3. The method of claim 1 further comprising controlling a shift from one transmission gear to another based on the transmission ratio.

4. The method of claim 1 wherein the step of selecting a transmission ratio comprises:
   selecting a transmission gear that optimizes fuel economy when the sensed knock activity is at a low level; and
   selecting a transmission gear that restricts fuel economy optimization when the sensed knock activity exceeds the low level.

5. The method of claim 1 wherein the step of selecting the transmission ratio comprises:
   selecting a transmission ratio map based on the knock level; and
   determining the transmission ratio based on the transmission ratio map.

6. The method of claim 5 wherein the step of selecting the transmission ratio map comprises changing the transmission ratio map when a change in knock levels is detected.

7. A method of calibrating a transmission of a vehicle including a control module and one or more modules that can detect knock, said method comprising:
   determining a plurality of levels of knock detectable in the vehicle;
   determining a plurality of transmission ratios applicable in the transmission; and
   associating the determined transmission ratios with the determined knock levels such that, when one of the knock levels is detected during operation of the vehicle, a transmission ratio associated with the detected knock level may be applied in the transmission.

8. The method of claim 7 further comprising including one or more of the determined transmission ratios in a ratio map.

9. The method of claim 7 further comprising associating the determined knock levels with the determined transmission ratios such that:
   when a low knock level is detected, one or more of the determined transmission ratios is applied to optimize fuel economy; and
   when a knock level higher than the low knock level is detected, one or more of the determined transmission ratios is applied to restrict fuel economy optimization.

10. The method of claim 9 wherein to optimize fuel economy comprises to reduce an engine speed.

11. The method of claim 10 wherein to restrict fuel economy optimization comprises to increase an engine speed.

12. The method of claim 11 wherein to restrict fuel economy optimization further comprises to reduce a manifold air pressure.

13. A system for controlling a vehicle having an engine and a transmission, said system comprising:
   one or more modules that detect knock activity in the engine;
   a control module that selects a transmission ratio map based on the knock activity and controls the transmission based on a transmission ratio from the transmission ratio map;
   wherein said control module determines a knock level based on said detected knock activity and selects the transmission ratio map based on the determined knock level; and
   wherein said control module compares said detected knock activity to at least one of a plurality of predetermined knock levels.

14. The system of claim 13 wherein said control module detects a change in knock levels and changes the transmission ratio map based on said change in knock levels.

15. The system of claim 13 wherein said control module:
   selects the transmission ratio map that optimizes fuel economy when said detected knock activity is at a low level; and
   selects the transmission ratio map that restricts fuel economy optimization when said detected knock activity exceeds the low level.

* * * * *